US011269680B2

(12) United States Patent
Minami

(10) Patent No.: US 11,269,680 B2
(45) Date of Patent: Mar. 8, 2022

(54) INFORMATION PROCESSING APPARATUS, INFORMATION PROCESSING SYSTEM, AND INFORMATION PROCESSING METHOD

(71) Applicant: Kohichiroh Minami, Kanagawa (JP)

(72) Inventor: Kohichiroh Minami, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 101 days.

(21) Appl. No.: 16/860,155

(22) Filed: Apr. 28, 2020

(65) Prior Publication Data
US 2020/0364079 A1 Nov. 19, 2020

(30) Foreign Application Priority Data

May 17, 2019 (JP) .............................. JP2019-093330

(51) Int. Cl.
G06F 9/46 (2006.01)
G06F 9/48 (2006.01)
(52) U.S. Cl.
CPC .................................. G06F 9/485 (2013.01)

(58) Field of Classification Search
CPC ........................................................ G06F 9/485
See application file for complete search history.

(56) References Cited

U.S. PATENT DOCUMENTS

2007/0271317 A1* 11/2007 Carmel .................... G06F 16/27
2017/0353615 A1* 12/2017 Hasegawa ............. G06F 3/1273
2019/0258558 A1*  8/2019 Beuch ................. G06F 11/3476
2019/0394343 A1* 12/2019 Sahara ............... H04N 1/00222

FOREIGN PATENT DOCUMENTS

JP       2007-174186     7/2007
JP       2011-039720     2/2011

* cited by examiner

Primary Examiner — Camquy Truong
(74) Attorney, Agent, or Firm — IPUSA, PLLC

(57) ABSTRACT

An information processing apparatus, an information processing system, and an information processing method, each of which: stores in a memory a retained log which has not been transferred to an external device, among a plurality of logs generated in response to execution of a job; and stop operating the information processing apparatus and reactivate the information processing apparatus, based on a number of retained logs.

10 Claims, 10 Drawing Sheets

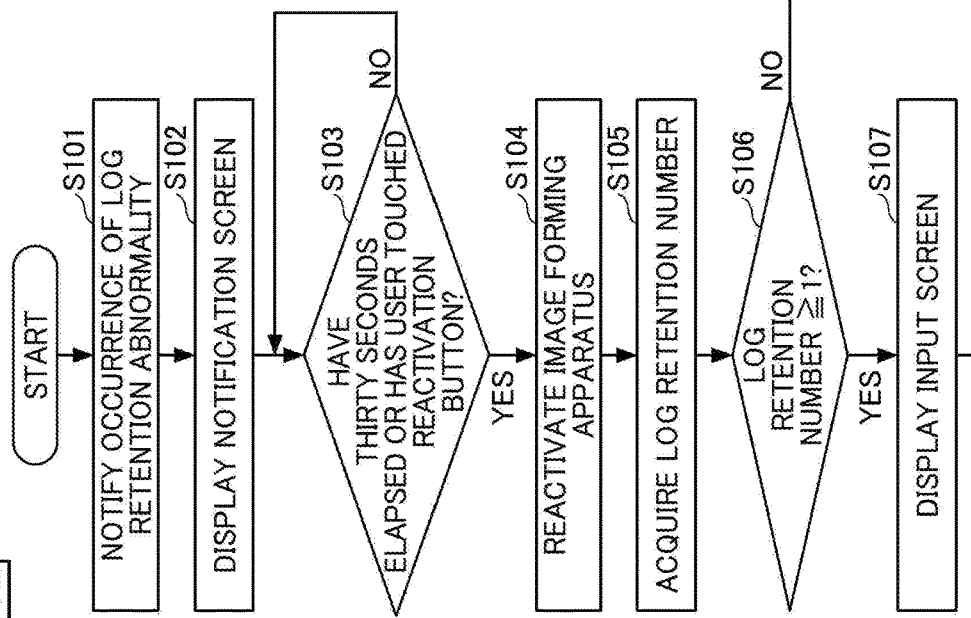

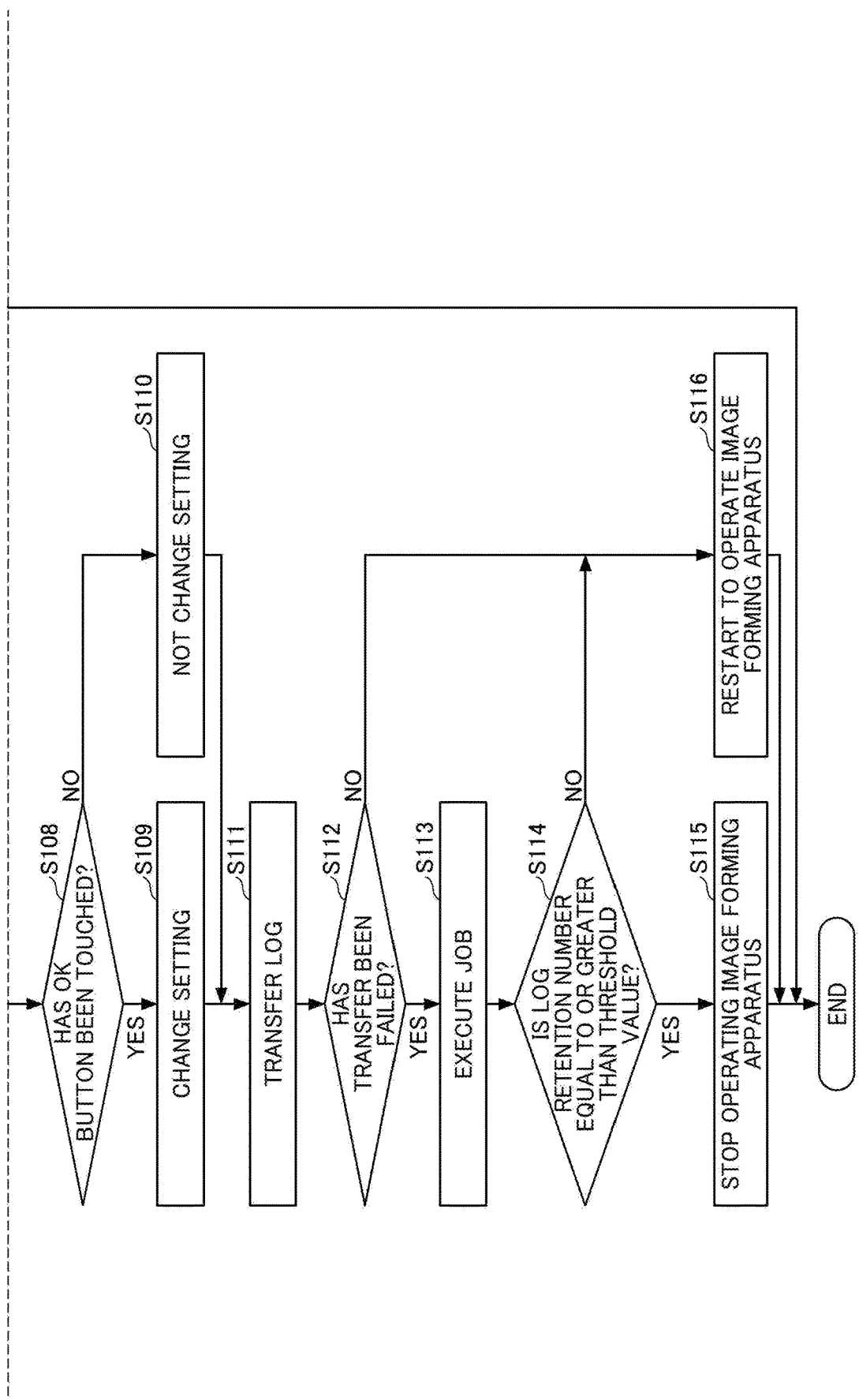

INFORMATION PROCESSING APPARATUS, INFORMATION PROCESSING SYSTEM, AND INFORMATION PROCESSING METHOD

CROSS-REFERENCE TO RELATED APPLICATIONS

This patent application is based on and claims priority pursuant to 35 U.S.C. § 119(a) to Japanese Patent Application No. 2019-093330, filed on May 17, 2019, in the Japan Patent Office, the entire disclosure of which is hereby incorporated by reference herein.

BACKGROUND

Technical Field

The present application relates to an information processing apparatus, an information processing system, and an information processing method.

Description of the Related Art

There has been known an information processing apparatus which transfers a log generated when a job is executed to an external device. In such an information processing apparatus, when a log, which is not transferred due to a failure of the apparatus, continues to be stored in the information processing apparatus. Accordingly, the storage capacity reaches the maximum capacity, and an old log may be deleted or a new log may not be stored, so that some logs may disappear.

On the other hand, there has been disclosed a technology for restricting the use of an information processing apparatus by a user when the number of logs stored in the information processing apparatus exceeds a predetermined threshold value.

However, there has been a case where the use of the information processing apparatus cannot be appropriately restarted after the use of the information processing apparatus has been restricted.

SUMMARY

Example embodiments include an information processing apparatus, an information processing system, and an information processing method, each of which: stores in a memory a retained log which has not been transferred to an external device, among a plurality of logs generated in response to execution of a job; and stop operating the information processing apparatus and reactivate the information processing apparatus, based on a number of retained logs.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 10A and 10B (FIG. 10) are a flowchart illustrating a processing example by the image forming apparatus according to the second embodiment.

Figure 1:
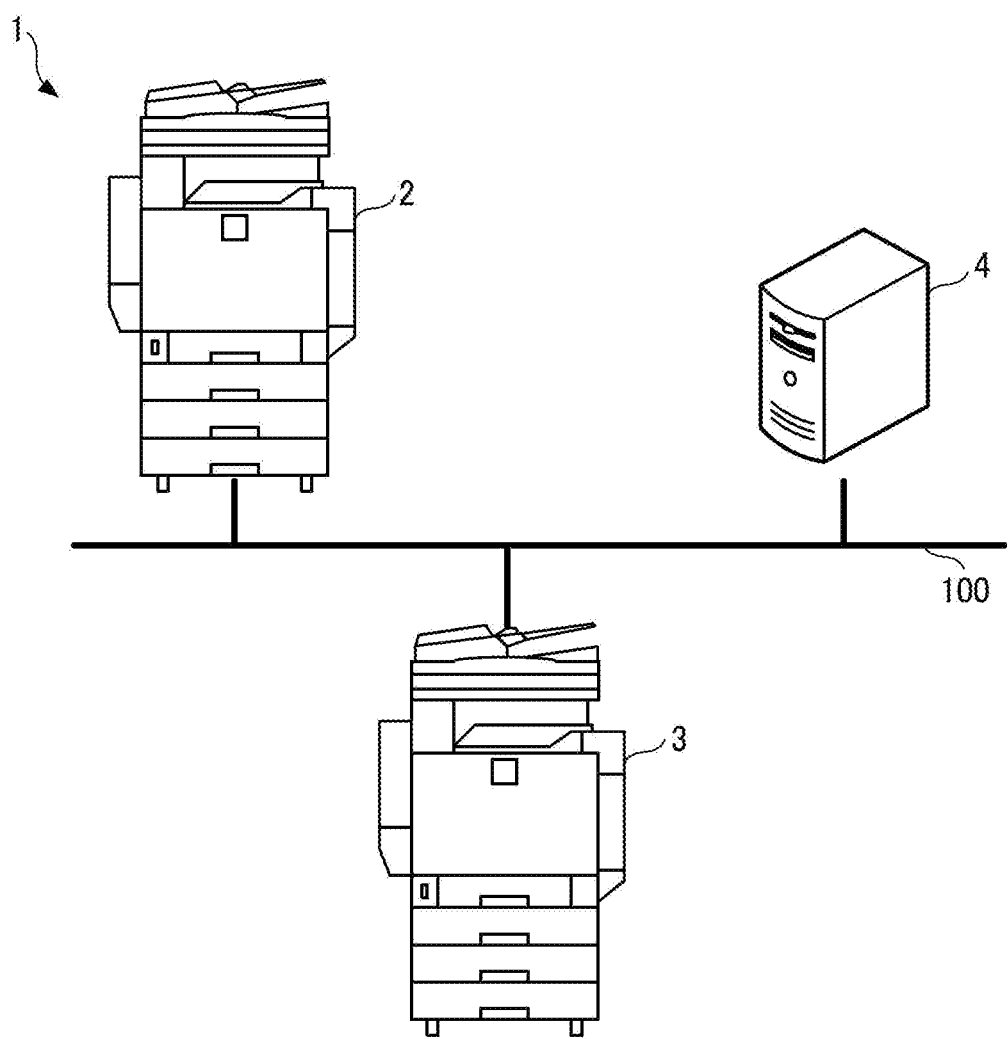
FIG. 1 is a diagram illustrating an exemplary configuration of an information processing system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments for carrying out the invention will be described with reference to the drawings. In the drawings, the same components are denoted by the same reference numerals, and duplicate description may be omitted.

In the embodiment of the present invention, among logs generated in response to job execution, a retained log which has not been transferred to an external device is stored, and the information processing apparatus is reactivated (i.e., rebooted) based on the number of the retained logs. Hereinafter, an information processing system including an image forming apparatus as an example of an information processing apparatus will be described.

FIG. 1 is a diagram for illustrating an exemplary configuration of an information processing system according to an embodiment of the present invention. As illustrated in FIG. 1, an information processing system 1 includes image forming apparatuses 2 and 3, and a log accumulation server 4. The apparatuses 2 and 3 and the log accumulation server 4 are communicably connected to one another via a network 100.

Each of the image forming apparatuses 2 and 3 is a multifunction peripheral, product, or printer (MFP) and has an image forming function such as copying, scanning, printing such as laser printing. Each of the image forming apparatuses 2 and 3 includes means for wireless communication or means for wired communication. FIG. 1 illustrates an example in which the information processing system 1 includes two image forming apparatuses 2 and 3. However, the information processing system 1 may include a plurality of image forming apparatuses. Since the image forming apparatuses 2 and 3 may have the same structure and function, only the image forming apparatus 2 of the image forming apparatuses 2 and 3 will be described below.

When a job is executed by the image forming apparatus 2, a log corresponding to the executed job is generated. The image forming apparatus 2 transfers the generated log to the log accumulation server 4 in which information such as an address is set in advance.

The log includes a device log and an image log. The device log is a log which records a detailed job content such as a person who executes a job or execution time of the job, the number of printed sheets by the image forming apparatus 2, and color or monochrome print. The image log is a log which records image data and simple information as bibliographic information.

When a retained log which has not been transferred to the log accumulation server 4 is generated in each of the device log and the image log, the image forming apparatus 2 stops or reactivates the operation of the image forming apparatus 2 based on the number of the retained logs.

The log accumulation server 4 as an example of an accumulation device is achieved by a computer in which a general operating system (OS) or the like is installed, and includes means for wireless communication or means for wired communication. When a log is transferred from the image forming apparatus 2 to the log accumulation server 4, the image forming apparatus 2 detects success or failure of the transfer. Based on the detection result, the image forming apparatus 2 stores the retained log, stops the operation of the image forming apparatus 2, or reactivates the image forming apparatus 2.

Figure 2:
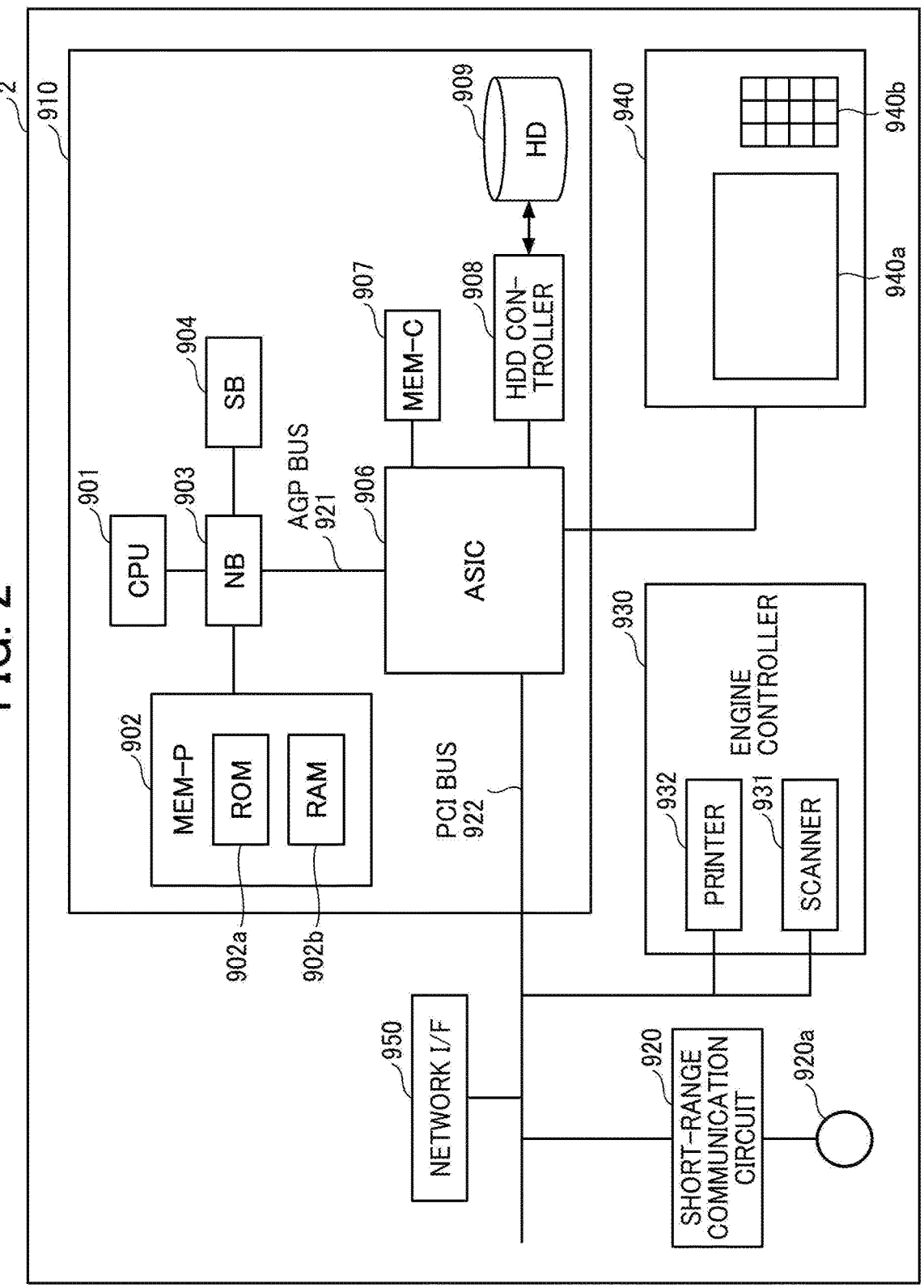
FIG. 2 is a block diagram of an exemplary hardware configuration of an image forming apparatus according to the embodiment of the present invention.

A hardware configuration of the image forming apparatus according to the embodiment of the present invention will be described. FIG. 2 is a block diagram illustrating an exemplary hardware configuration of the image forming apparatus 2. As illustrated in FIG. 2, the image forming apparatus 2 includes a controller 910, a short-range communication circuit 920, an engine controller 930, an operation panel 940, and a network interface (I/F) 950.

The controller 910 includes a central processing unit (CPU) 901, a system memory (MEM-P) 902, a north bridge (NB) 903, a south bridge (SB) 904, an application specific integrated circuit (ASIC) 906, a local memory (MEM-C) 907 as a memory, a hard disk drive (HDD) controller 908, and a hard disk (HD) 909 as a memory. The NB 903 and the ASIC 906 are coupled to each other via an accelerated graphics port (AGP) bus 921.

The CPU 901 is a controller that controls the entire image forming apparatus 2. The NB 903 is a bridge for coupling the CPU 901 with the MEM-P 902, the SB 904, and the AGP bus 921. The NB 903 includes a memory controller that controls reading from or writing to the MEM-P 902, a peripheral component interconnect (PCI) master, and an AGP target.

The MEM-P 902 includes a read only memory (ROM) 902a, which is a memory for storing programs and data for realizing each function of the controller 910, and a random access memory (RAM) 902b used for decompressing programs and data, and as a drawing memory for memory printing.

The programs stored in the RAM 902b may be provided by being recorded in a non-transitory computer-readable recording medium such as a compact disc (CD)-ROM, a CD-R, and a digital versatile disc (DVD) in a file in an installable format or an executable format.

The SB 904 is a bridge for coupling the NB 903 with a PCI device, and a peripheral device. The ASIC 906 is an integrated circuit (IC) for image processing having hardware elements for image processing, and has a role of a bridge that couples the AGP bus 921, the PCI bus 922, the HDD controller 908, and the MEM-C 907, respectively.

The ASIC 906 includes a PCI target and an AGP master, an arbiter (ARB) that forms the core of the ASIC 906, a memory controller that controls the MEM-C 907, and a plurality of direct memory access controllers (DMACs) that rotate image data using hardware logic or the like, and a PCI unit for transferring data between the scanner 931 and the printer 932 via the PCI bus 922.

The ASIC 906 may be coupled by an interface such as a USB interface and an institute of electrical and electronics engineers (IEEE)1394.

The MEM-C 907 is a local memory used as an image buffer for copying and a code buffer. The HD 909 is a storage for accumulating image data, font data used for printing, and a form. The HDD controller 908 controls reading from or writing to the HDD controller 908 under the control of the CPU 901.

The AGP bus 921 is a bus interface for a graphics accelerator card proposed to speed up graphic processing. The AGP bus 921 can speed up the graphics accelerator card by directly accessing the MEM-P 902 at high throughput.

The short-range communication circuit 920 includes a short-range communication circuit 920a. The short-range communication circuit 920 is a communication circuit such as near field communication (NFC) and Bluetooth (registered trademark).

The engine controller 930 is implemented by the scanner 931 and the printer 932. The operation panel 940 includes a panel display 940a such as a touch panel that displays current setting values, a selection screen, and the like, and that receives input from a person who operates the panel, and an operation panel 940b including a numeric keypad for receiving set values for image forming conditions such as density setting conditions, a start key for receiving a copy start instruction, and the like.

The controller 910 controls the entire image forming apparatus 2 and controls, for example, drawing (rendering), communication, input from the operation panel 940, and the like. The scanner 931 or the printer 932 includes an image processing such as error diffusion and gamma conversion.

The image forming apparatus 2 can sequentially switch and select a document box function, a copy function, a printer function, and a facsimile function by using an application switching key on the operation panel 940.

A document box mode is set when the document box function is selected, a copy mode is set when the copy function is selected, a printer mode is set when the printer function is selected, and a facsimile mode is set when the facsimile function is selected.

The network I/F 950 is an interface for performing data communication by using the network 100. The short-range communication circuit 920 and the network I/F 950 are electrically coupled to the ASIC 906 via the PCI bus 922.

Figure 3:
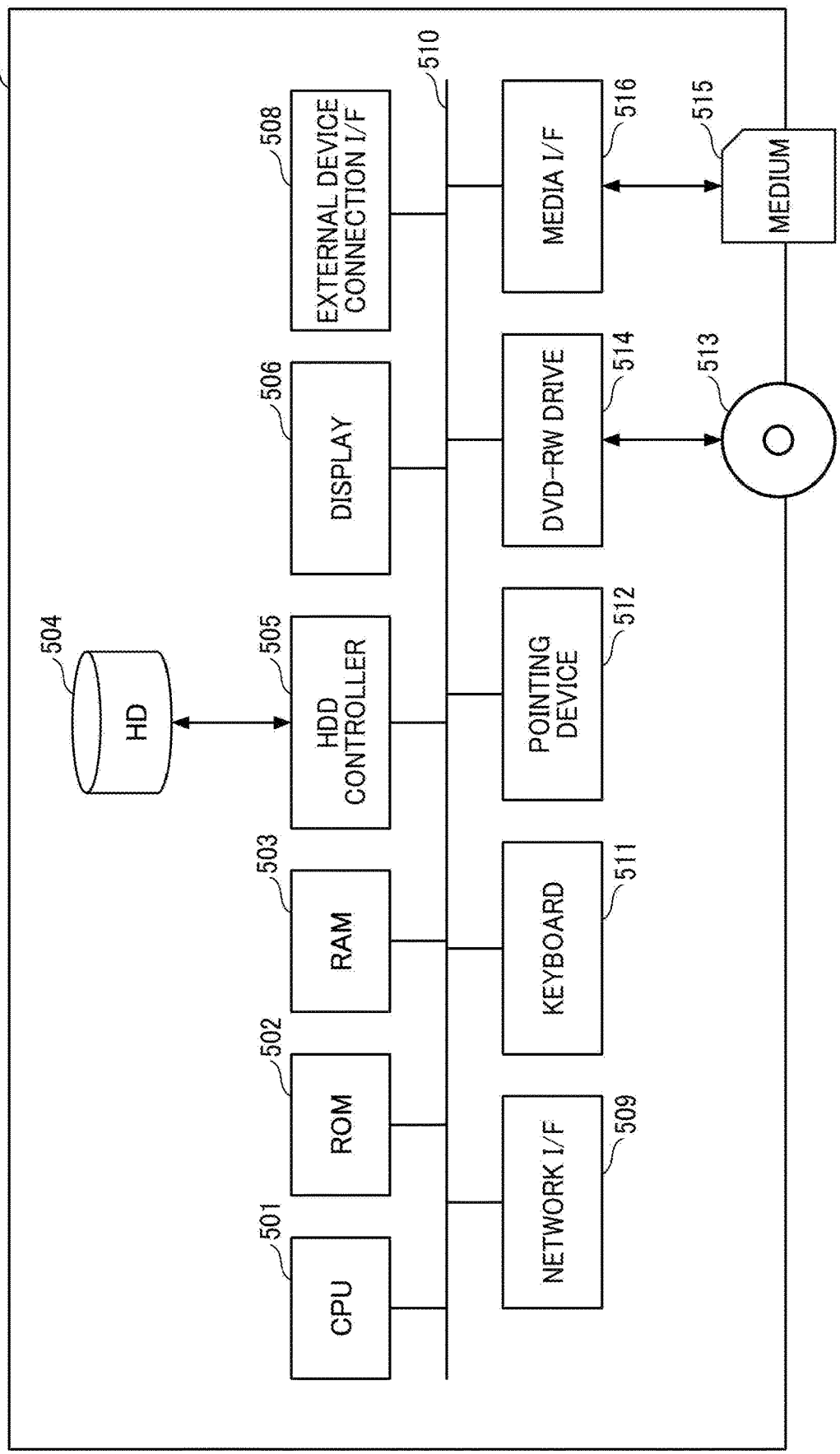
FIG. 3 is a block diagram of an exemplary hardware configuration of a log accumulation server according to the embodiment of the present invention.

A hardware configuration of the log accumulation server according to the present embodiment will be described. FIG. 3 is a block diagram illustrating an exemplary hardware configuration of the log accumulation server 4. The log accumulation server 4 is implemented by a computer.

As illustrated in FIG. 3, the log accumulation server 4 includes a CPU 501, a ROM 502, a RAM 503, an HD 504, and an HDD controller 505. The log accumulation server 4 includes a display 506, an external device connection I/F 508, a network I/F 509, a data bus 510, a keyboard 511, a pointing device 512, a digital versatile disk rewritable (DVD-RW) drive 514, and a media I/F 516.

The CPU 501 controls the operation of the entire log accumulation server 4. The ROM 502 stores a program used for driving the CPU 501, such as an initial program loader (IPL). The RAM 503 is used as a work area for the CPU 501.

The HD 504 stores various types of data such as a program. The HDD controller 505 controls reading or writing of various data from or to the HD 504 in accordance with the control of the CPU 501. The display 506 displays various kinds of information such as a cursor, a menu, a window, a character, and an image.

The external device connection I/F 508 is an interface for coupling various external devices. In this case, the external device is a universal serial bus (USB) memory, a printer, or the like. The network I/F 509 is an interface for performing data communication by using the network 100. The data bus 510 may be an address bus, a data bus or the like for electrically connecting each component such as the CPU 501.

The keyboard 511 is a type of input means having a plurality of keys for inputting a character, a numeric value, various instructions, and the like. The pointing device 512 is a type of input means for selecting and executing various instructions, selecting a processing object, moving the cursor, and the like.

The DVD-RW drive 514 controls reading or writing of various data from or to a DVD-RW 513 as an example of a removable recording medium. The removable recording medium is not limited to the DVD-RW, and may be a DVD-R and the like. The media I/F 516 controls reading or writing (memory) of data from or to a recording medium 515 such as a flash memory.

Figure 4:
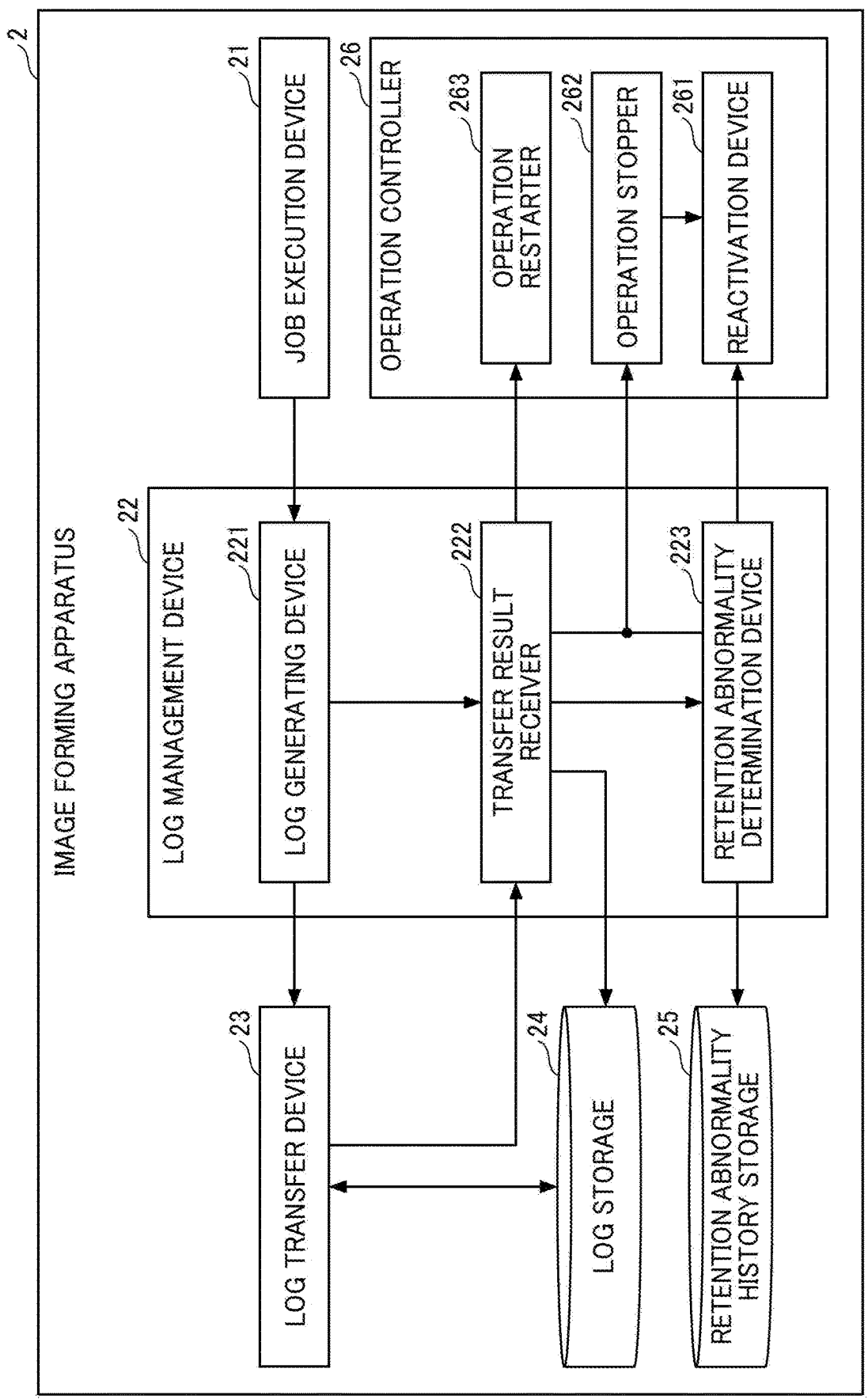
FIG. 4 is a block diagram illustrating an exemplary functional configuration of an image forming apparatus according to a first embodiment.

The functional configuration of the image forming apparatus 2 according to a first embodiment will be described. FIG. 4 is a block diagram illustrating an exemplary functional configuration of the image forming apparatus 2. As illustrated in FIG. 4, the image forming apparatus 2 includes a job execution device 21, a log management device 22, a log transfer device 23, a log storage 24, a retention abnormality history storage 25, and an operation controller 26.

The log storage 24 and the retention abnormality history storage 25 are achieved by a nonvolatile memory such as the HD 909 in FIG. 2, and the job execution device 21, the log management device 22, the log transfer device 23, and the operation controller 26 are achieved by executing a predetermined program by the CPU 901 in FIG. 2.

In FIG. 4, the log management device 22 receives a log accumulation request from the job execution device 21 in response to job execution, generates a log related to the job, and transfers the generated log to the log accumulation server 4 via the log transfer device 23. The transferred log is stored in the log accumulation server 4. When a log transfer device to the log accumulation server 4 fails due to a failure or the like of the image forming apparatus 2, the log management device 22 stores the log which have failed to be transferred as a retained log in the log storage 24, and counts the number of the retained logs.

When retention abnormality occurs in which the count number of the retained logs by the log management device 22 becomes equal to or more than a predetermined threshold value, the operation controller 26 receives a notification indicating the occurrence of the retention abnormality from the log management device 22, stops the operation of the image forming apparatus 2, and then reactivates the image forming apparatus 2. After the operation controller 26 reactivates the image forming apparatus 2, the retained logs stored in the log storage 24 are transferred to the log accumulation server 4 via the log transfer device 23. When the transfer is successful, the image forming apparatus 2 releases to stop the operation, and restart the operation. The detailed function of each unit will be described below.

The job execution device 21 receives an operation for indicating a job execution instruction operated by the user, and executes a job such as copying, scanning, printing, and facsimileing. After executing the job, the job execution device 21 requests the log management device 22 to store the log relating to the job to the log accumulation server 4.

The log management device 22 includes a log generating device 221, a transfer result receiver 222, and a retention abnormality determination device 223, and provides functions such as log generation, transfer instruction, and determination of log retention abnormality.

The log generating device 221 responds to a log accumulation request received from the job executor 21 to generate a log corresponding to the request. Then, the log generating device 221 outputs the generated log to the log transfer device 23, and instructs a log transfer.

The log transfer device 23 transfers the log to the log accumulation server 4 in response to the log transfer instructed by the log generating device 221. The log transfer device 23 detects successful transfer or failed transfer to the log accumulation server 4, and notifies the detection result to the transfer result receiver 222.

The transfer result receiver 222 receives a notification indicating the successful transfer or failed transfer from the log transfer device 23. When the notification indicates the failed transfer of the log, the transfer result receiver 222 outputs the log related to the failed transfer acquired from the log generating device 221 to the log storage 24 to store the log as a retained log, and notifies the retention abnormality determination device 223 of the failed transfer.

After the count number of the retained logs becomes equal to or more than the predetermined threshold value, and the image forming apparatus 2 is reactivated, when the transfer of the retained logs stored in the log storage 24 to the log accumulation server 4 fails, the transfer result receiver 222 notifies the operation stopper 262 of the failed transfer. On the other hand, when the transfer is successful, the transfer result receiver 222 notifies an operation restarter 263 of the successful transfer.

The retention abnormality determination device 223 determines log retention abnormality based on the number of the retained logs. When retention abnormality occurs, the retention abnormality determination device 223 notifies a reactivation device 261 and the operation stopper 262 of the retention abnormality.

More specifically, the retention abnormality determination device 223 counts the number of the retained logs in response to the notification indicating the failed transfer from the transfer result receiver 222. When the count number of the retained logs becomes equal to or more than the predetermined threshold value, the retention abnormality determination device 223 notifies the reactivation device 261 and the operation stopper 262 of the occurrence of the log retention abnormality.

The method for determining the log retention abnormality is not limited to the above. As another example of the determination method, the retention abnormality determination device 223 may responds to a notification indicating the failed transfer to add the data size of the retained log, and may determine the occurrence of the log retention abnormality when the accumulated data size of the added retained logs becomes equal to or greater than a predetermined threshold. As still another example, the retention abnormality determination device 223 may acquire information regarding the number or the data size of retained logs by referring to the log storage 24, and may determine the occurrence of the log retention abnormality based on the acquired information.

Each of the threshold of the number and the threshold of the size is determined in advance based on the maximum capacity storable in the log storage 24 and the like. Each of the threshold of the number and the threshold of the size is an example of the predetermined threshold.

When the log retention abnormality occurs, the retention abnormality determination device 223 outputs information relating to the log retention abnormality such as the occurrence date and time and the job information in which the retained log occurs to the retention abnormality history storage 25, in order to store the information as a retention abnormality history. Storing the retention abnormality history allows to notify a serviceman who maintains and manages the image forming apparatus 2 when the same retention abnormality occurs a plurality of times, and to promote to eliminate the log retention.

The operation controller 26 includes the reactivation device 261, the operation stopper 262, and the operation restarter 263, and provides a control function of the image forming apparatus 2 which responds to the success or failure of the log transfer.

When the operation stopper 262 is notified of the occurrence of the log retention abnormality from the retention abnormality determination device 223, the operation stopper 262 notifies the respective units in the image forming apparatus 2 of the log retention abnormality, and stops the operation of the image forming apparatus 2. After stopping the operation of the image forming apparatus 2, the reactivation device 261 reactivates the image forming apparatus 2.

After the reactivation device 261 reactivates the image forming apparatus 2, the log transfer device 23 transfers the retained log stored in the log storage 24 again to the log accumulation server 4 under a predetermined condition. When the transfer fails, the operation stopper 262 stops operating the image forming apparatus 2 under the predetermined condition in response to a notification notifying the failed transfer from the transfer result receiver 222. On the other hand, when the transfer is successful, the operation restarter 263 releases to stop operating the image forming apparatus 2 in response to a notification notifying the successful transfer from the transfer result receiver 222, and restarts the operation of the image forming apparatus 2.

Figure 5:
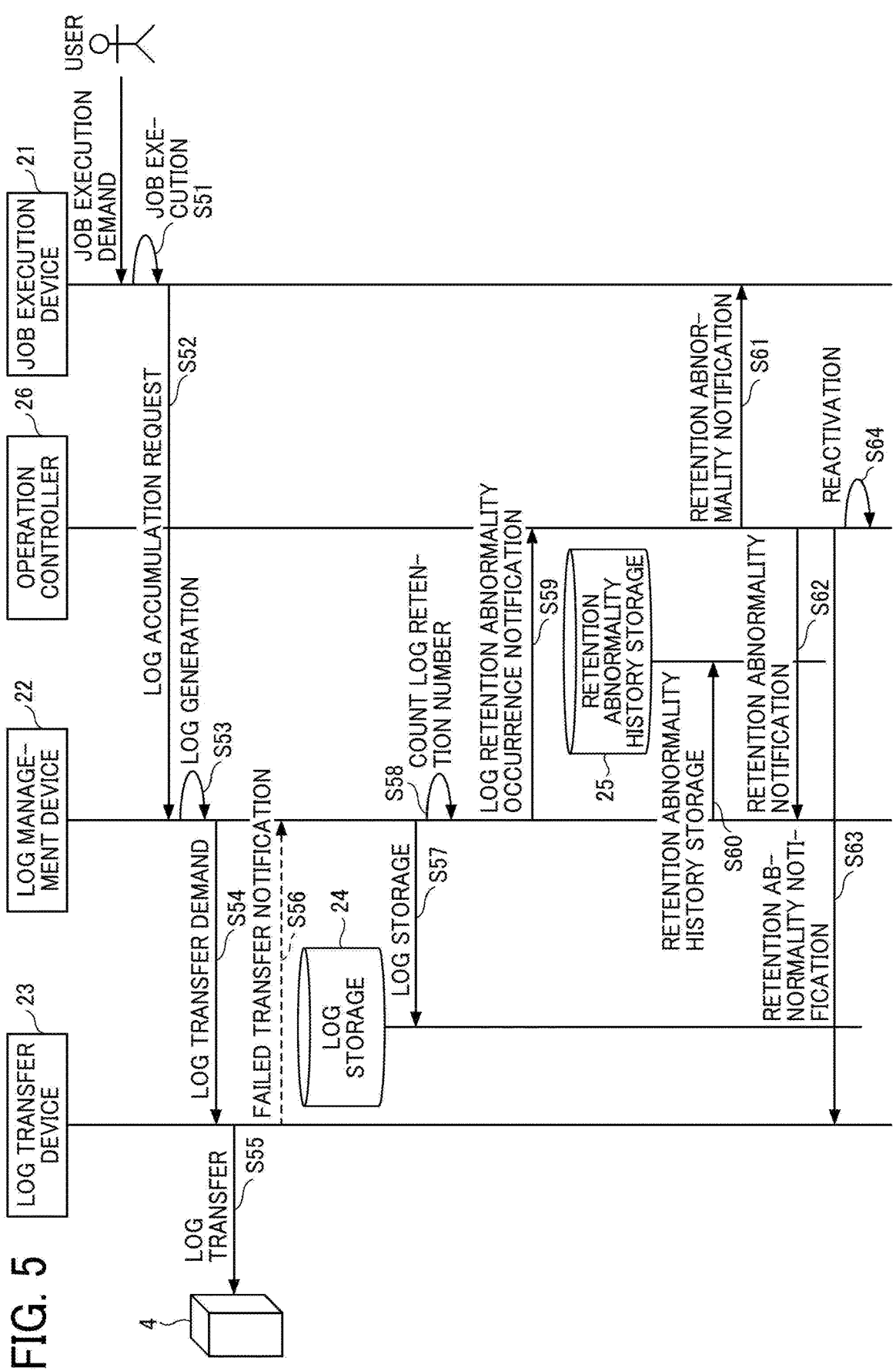
FIG. 5 is a sequence diagram illustrating a processing example by the image forming apparatus according to the first embodiment.

The operation of the image forming apparatus 2 according to the first embodiment will be described with reference to FIGS. 5 and 6. FIG. 5 is a sequence diagram illustrating an example of the operation of the image forming apparatus 2 from the time when a job is executed to the time when the image forming apparatus 2 is reactivated based on the number of retained logs.

In step S51, the job execution device 21 receives an operation indicating a job execution instruction operated by the user, and executes the job.

In step S52, the job execution device 21 requests the log management device 22 to store a log relating to the executed job in the log accumulation server 4.

In step S53, the log generating device 221 in the log management device 22 generates the log in response to the log accumulation request from the job execution device 21.

In step S54, the log generating device 221 outputs the generated log to the log transfer device 23, and instructs the log transfer device 23 to transfer the log to the log accumulation server 4.

In step S55, in response to the log transfer instruction, the log transfer device 23 transfers the log input from the log generating device 221 to the log accumulation server 4.

In step S56, the log transfer device 23 detects successful transfer or failed transfer to the log accumulation server 4. When the transfer fails, the log transfer device 23 notifies the log management device 22 of the failed transfer.

In step S57, the transfer result receiver 222 in the log management device 22 acquires the log of the failed transfer from the log generating device 221 in response to the failed transfer notification, and outputs the log to the log storage 24, so as to store the log as a retained log in the log storage 24. The transfer result receiver 222 notifies the retention abnormality determination device 223 in the log management device 22 of the failed transfer.

In step S58, the retention abnormality determination device 223 counts the number of the retained logs in response to the notification indicating the failed transfer.

When the count number of the retained logs becomes equal to or greater than a predetermined threshold value, in step S59, the retention abnormality determination device 223 notifies the operation controller 26 of the occurrence of the log retention abnormality.

In step S60, the retention abnormality determination device 223 outputs information related to the retention abnormality such as the occurrence date and time of the log retention abnormality and the job information in which the retained log has occurred to the retention abnormality history storage 25, so as to store the information in the retention abnormality history storage 25.

In step S61, the operation stopper 262 in the operation controller 26 notifies the job execution device 21 of the log retention abnormality, so as to stop the operation of the job execution device 21.

In step S62, the operation stopper 262 notifies the log management device 22 of the log retention abnormality, so as to stop the operation of the log management device 22.

In step S63, the operation stopper 262 notifies the log transfer device 23 of the log retention abnormality, so as to stop the operation of the log transfer device 23. The operation stopper 262 notifies each unit in the image forming apparatus 2 of the log retention abnormality, so as to stop the operation of the image forming apparatus 2.

In step S64, the reactivation device 261 in the operation controller 26 reactivates the image forming apparatus 2.

In this manner, the image forming apparatus 2 can stop the operation of the image forming apparatus 2 based on the log retention abnormality, and reactivate the image forming apparatus 2 after stopping the operation.

Figure 6:
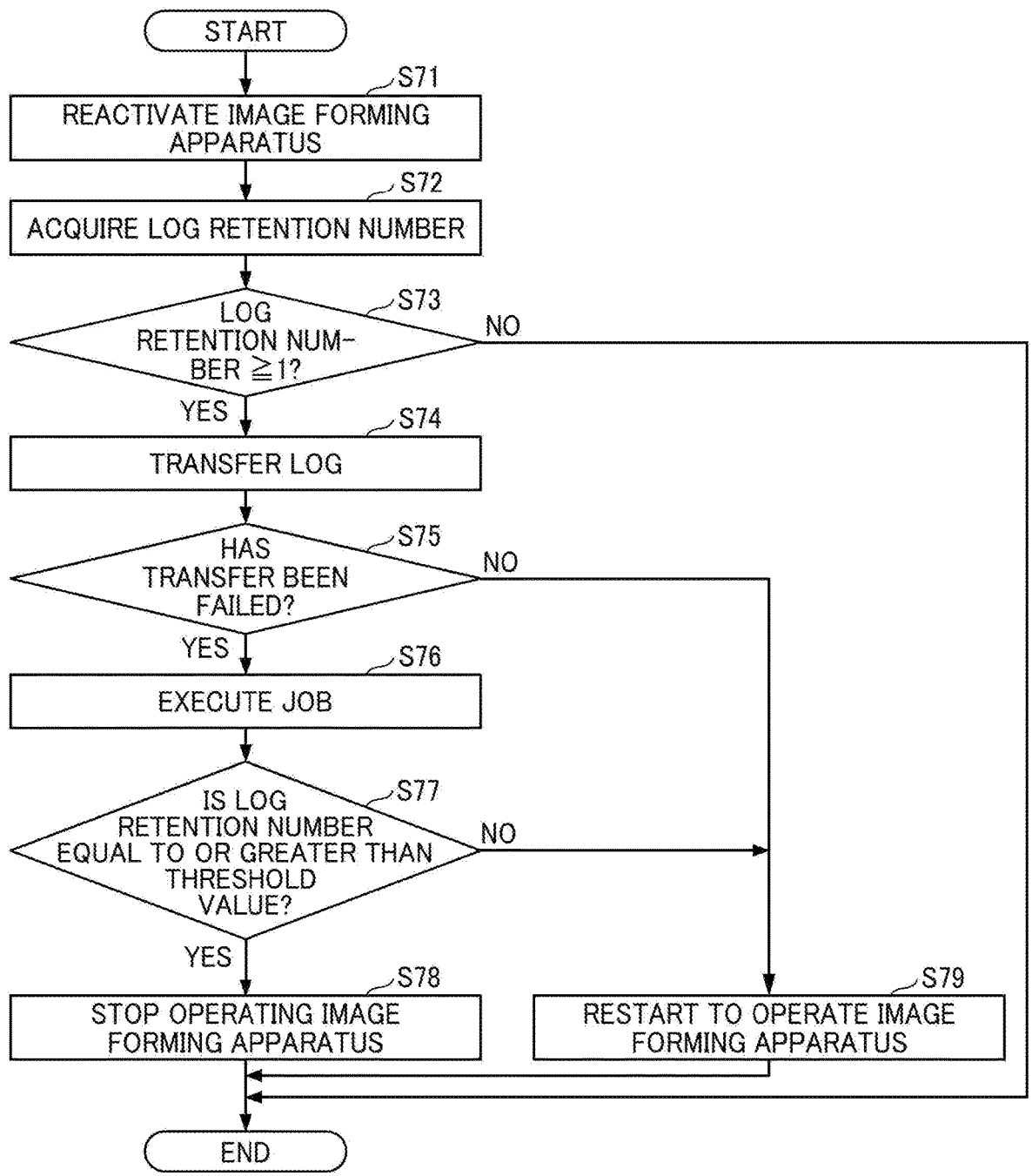
FIG. 6 is a flowchart illustrating the processing example by the image forming apparatus according to the first embodiment.

FIG. 6 is a flowchart illustrating an example of an operation of the image forming apparatus 2 after the image forming apparatus 2 is reactivated based on the number of retained logs until the operation of the image forming apparatus 2 is restarted or stopped.

In step S71, the reactivation device 261 reactivates the image forming apparatus 2.

In step S72, the log transfer device 23 acquires the number of the retained logs in the log storage 24.

In step S73, the log transfer device 23 determines whether the number of the acquired retained logs is one or more.

In step S73, when the number of the retained logs is not one or more (step S73, No), the image forming apparatus 2 ends the operation.

In step S73, when the number of the retained logs is one or more (step S73, Yes), the log transfer device 23 transfers the retained log(s) in the log storage 24 to the log accumulation server 4 in step S74.

In step S75, the log transfer device 23 determines whether the log transfer has failed.

When the log transfer device 23 determines in step S75 that the log transfer has not failed (step S75, No), the process proceeds to step S79.

In step S75, when the log transfer device 23 determines that the log transfer has failed (step S75, Yes), in step S76, the job execution device 21 receives an operation indicating an execution instruction of the job operated by the user, and executes the job.

In step S77, the retention abnormality determination device 223 determines whether the number of the retained logs is equal to or greater than a threshold value.

In step S77, when the retention abnormality determination device 223 determines that the number of the retained logs is equal to or greater than the threshold value (step S77, Yes), the operation stopper 262 stops the operation of the image forming apparatus 2 in step S78.

In step S77, when the retention abnormality determination device 223 determines that the number of the retained logs is not greater than or equal to the threshold value (step S77, No), in step S79, the operation restarter 263 releases to stop the operation of the image forming apparatus 2, and restarts the operation of the image forming apparatus 2.

In this manner, the image forming apparatus 2 can restart the operation after the reactivating due to the log retention abnormality. When the log retention abnormality is not resolved even after the reactivating due to the log retention abnormality, the image forming apparatus 2 can stop the operation, thereby preventing the log lost.

As described above, in the present embodiment, among the logs generated in response to the execution of jobs, the retained log not transferred to the log accumulation server 4 is stored, and the operation of the image forming apparatus 2 is stopped based on the number of the retained logs, and the image forming apparatus 2 is reactivated. In the case where the log retention abnormality occurs, the operation of the image forming apparatus 2 is stopped. Therefore, it is possible to appropriately prevent any retained log in the log storage 24 from disappearing by deleting an old log from the log storage 24 or not storing a new log into the log storage 24 due to the excess of the maximum storage capacity of the log storage 24.

Log transfer may fail due to the occurrence of a memory full or the occurrence of an internal error of the image forming apparatus 2, and log retention abnormality may occur. In such a case, the retention abnormality is resolved by reactivating the image forming apparatus 2. In the embodiment of the present invention, the image forming apparatus 2 is reactivated after stopping the operation. Therefore, in the embodiment of the present invention, after suppressing the use of the image forming apparatus 2 by stopping the operation of the image forming apparatus 2, it is possible to resolve the log retention abnormality caused by the occurrence of the memory full or the internal error, and appropriately restart the use of the image forming apparatus 2 by the user.

Even after reactivating the image forming apparatus 2, when the log retention abnormality is not resolved, it is possible to prevent any log from being lost because the operation of the image forming apparatus 2 is stopped.

An image forming apparatus 2a according to a second embodiment will be described. The description of the same components as those of the embodiment described above will be omitted.

In case where log retention abnormality occurs, when an image forming apparatus 2a is automatically reactivated, the user of the image forming apparatus 2a cannot grasp the situation, so that the user may be confused. In the embodiment of the present invention, when log retention abnormality occurs, a notification screen for notifying the user of reactivating the image forming apparatus 2a is displayed before reactivating the image forming apparatus 2a.

Further, log retention abnormality may occur due to the fact that setting information for transferring a log to the log accumulation server 4 such as a uniform resource locator (URL) and a port number of the log accumulation server 4 set in the image forming apparatus 2a (hereinafter referred to as transfer setting information) is incorrect. In such a case, the log retention abnormality is resolved by changing the transfer setting information. Accordingly, in the embodiment of the present invention, after reactivating the image forming apparatus 2a due to the log retention abnormality, an input screen on which the user inputs the transfer setting information is displayed.

Figure 7:
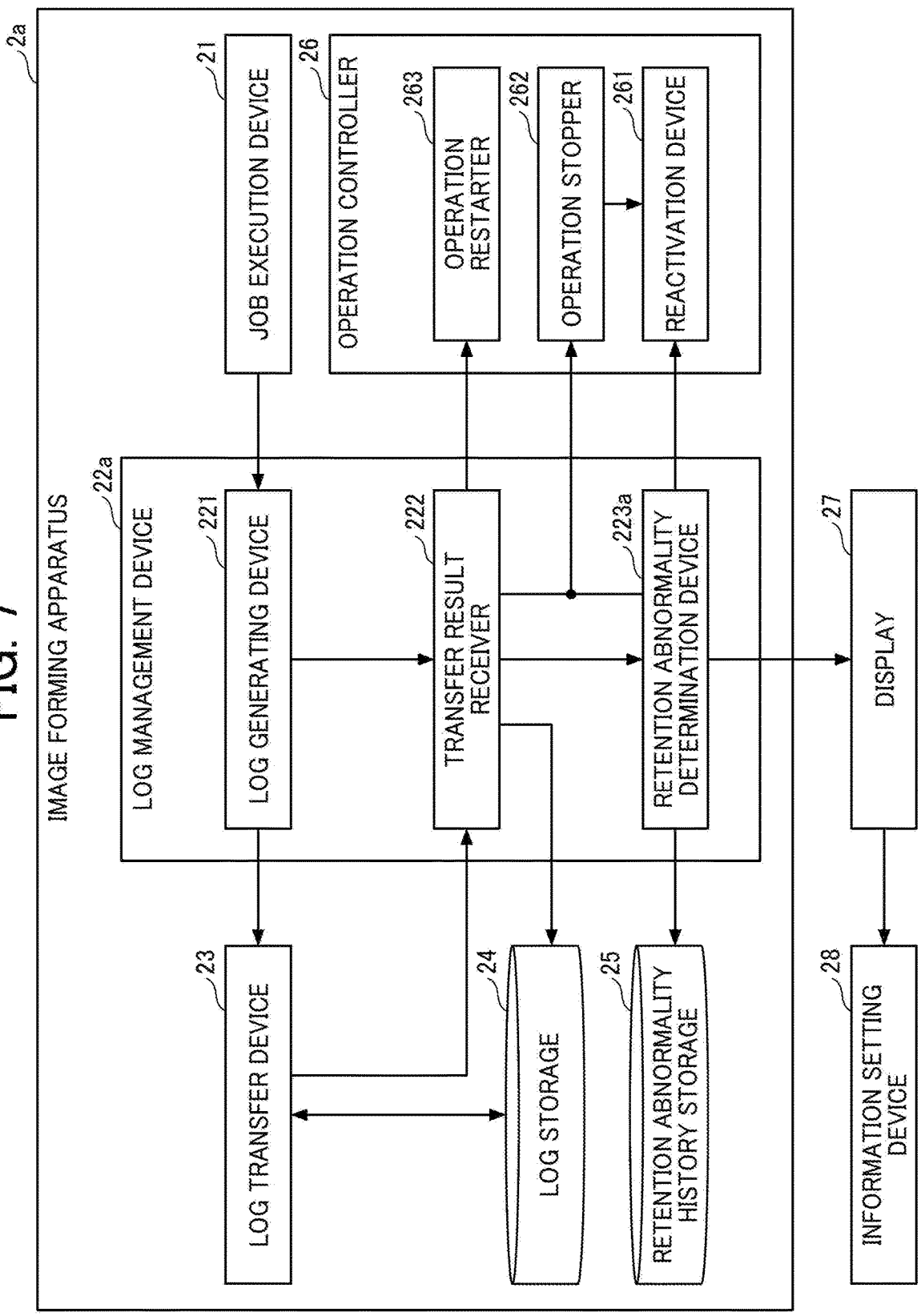
FIG. 7 is a block diagram illustrating an exemplary functional configuration of an image forming apparatus according to a second embodiment.

FIG. 7 is a block diagram illustrating an exemplary functional configuration of the image forming apparatus 2a according to the present embodiment. As illustrated in FIG. 7, the image forming apparatus 2a includes a log management device 22a, a display 27, and an information setting device 28. The log management device 22a includes a retention abnormality determination device 223a.

The retention abnormality determination device 223a determines log retention abnormality based on the number of retained logs. In the case where the retention abnormality occurs, the retention abnormality determination device 223a notifies the reactivation device 261, the operation stopper 262, and the display 27 of the retention abnormality.

When the display 27 receives the notification of the occurrence of the retention abnormality from the retention abnormality determination device 223, the display 27 displays a notification screen 81 for notifying the user of reactivating the image forming apparatus 2a (referring to FIG. 8), on the panel display 940a in FIG. 2, before reactivating the image forming apparatus 2a. After the reactivation device 261 reactivates the image forming apparatus 2a, the display 27 displays an input screen 91 on which the user inputs the transfer setting information for transferring a log (referring to FIG. 9), on the panel display 940a.

The display 27 is an example of a first display, and is an example of a second display. The first display for displaying the notification screen and the second display for displaying the input screen may be separate components.

The information setting device 28 changes the transfer setting information on the basis of information input by the user via the input screen 91.

Figure 8:
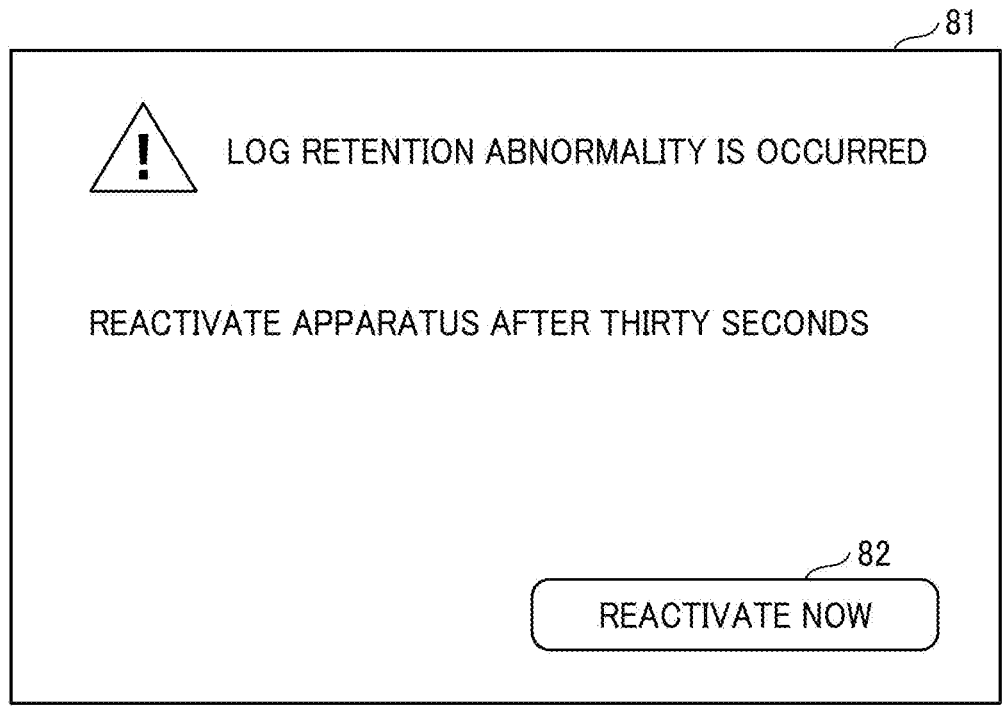
FIG. 8 is a diagram illustrating an example of a notification screen for reactivating.

FIG. 8 is a diagram illustrating an example of the notification screen for reactivating. As illustrated in FIG. 8, the notification screen 81 indicating that log retention abnormality has occurred and that the device (image forming apparatus 2a) will be reactivated after thirty (30) seconds is displayed on the panel display 940a in the image forming apparatus 2a. The example in FIG. 8 illustrates that the image forming apparatus 2a reactivates after thirty (30) seconds. The time required for the image forming apparatus 2 to reactivate after the notification by the notification screen 81 may be arbitrarily set by the user.

A reactivation button 82 in FIG. 8 is a button for immediately reactivating in response to touching by the user. The reactivation button 82 allows to reduce the waiting time of the user until the image forming apparatus 2 reactivates.

Figure 9:
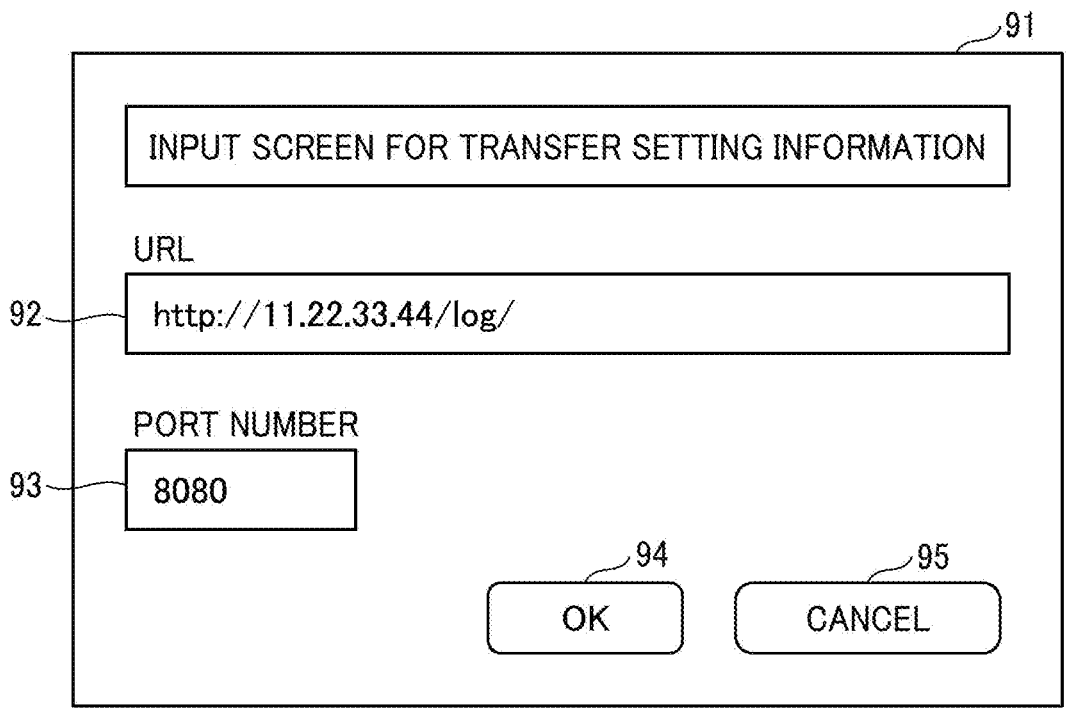
FIG. 9 is a diagram illustrating an example of an input screen for log accumulation server information.

FIG. 9 is a diagram illustrating an example of the input screen 91 for the transfer setting information. An edit box 92 is a box for inputting the URL of the log accumulation server 4. An edit box 93 is a box for inputting the port number of the log transfer.

After inputting into the edit boxes 92 and 93, when the user touches an OK button 94, the setting information for the URL is changed to the setting information input to the edit box 92. The setting information for the port number is changed to the setting information input to the edit box 93. When the user touches a cancel button 95, the transfer setting information is not changed.

FIG. 10 is a flowchart illustrating an example of the operation of the image forming apparatus 2a after the image forming apparatus 2 is reactivated based on the number of retained logs until the operation of the image forming apparatus 2 is restarted or stopped.

In step S101, the retention abnormality determination device 223a determines log retention abnormality based on the number of retained logs. When retention abnormality occurs, the retention abnormality determination device 223a notifies the reactivation device 261, the operation stopper 262, and the display 27 of the retention abnormality.

In step S102, the display 27 reactivates the image forming apparatus 2a, and displays the notification screen 81 for notifying the user on the panel display 940a.

In step S103, the display 27 determines whether thirty (30) seconds have elapsed after the display of the notification screen 81 or whether the user has touched the reactivation button 82 on the notification screen 81.

When the display 27 determines in step S103 that thirty (30) seconds have elapsed after the display of the notification screen 81 or the user has touched the reactivation button 82 (step S103, Yes), the process proceeds to step S104. When the display 27 does not determine that thirty (30) seconds have elapsed after the display of the notification screen 81 or the user has touched the reactivation button 82 (step S103, No), the operation of step S103 is repeated again.

Since the operations in steps S104 to S106 are the same as the operations in steps S61 to S63 in FIG. 6, duplicate description will be omitted.

After step S106, in step S107, the display 27 displays the input screen 91 on which the user inputs the transfer setting information.

In step S108, the display 27 determines whether the user has touched the OK button 94 on the input screen 91.

When the display 27 determines in step S108 that the user has touched the OK button 94, the information setting device 28 changes the transfer setting information based on the information input by the user on the input screen 91. Thereafter, the process proceeds to step S111.

In step S108, when the display 27 determines that the user has not touched the OK button 94, the information setting device 28 does not change the transfer setting information. Thereafter, the process proceeds to step S111.

Since the operations in steps S111 to S116 thereafter are the same as the operations in steps S64 to S69 in FIG. 6, duplicate description will be omitted.

In FIG. 10, whether log retention abnormality has occurred is determined in step S114. Therefore, the transfer setting information can be changed between the reactivating of the image forming apparatus 2a (step S104) and step S114. Therefore, the operations of steps S107 to S110 may be inserted in any steps between steps S104 and S114.

As described above, in the embodiment of the present invention, when log retention abnormality occurs, the notification screen which notifies to reactivate the image forming apparatus 2a is displayed. Thus, in the embodiment of the present invention, since the user can recognize that the image forming apparatus 2a is reactivated, it is possible to reactivate the image forming apparatus 2a without confusing the user.

In the embodiment of the present invention, after the image forming apparatus 2a is reactivated by the log retention abnormality, the input screen on which the user inputs the transfer setting information is displayed. Thus, when log retention abnormality occurs due to the erroneous transfer setting information, the embodiment can eliminate the log retention abnormality.

Although the embodiments of the present invention have been described above, the present invention is not limited to the above-described embodiments specifically disclosed, and various modifications and changes can be made without departing from the scope of the claims.

Although the image forming apparatus 2 is described as an example of the information processing apparatus in the above-described embodiments, the present invention is not limited thereto. The information processing apparatus may be a projector (PJ), an interactive white board (IWB: a white board having an electronic blackboard function capable of mutual communication), an output device such as a digital signage, a head up display (HUD) device, an industrial machine, an imaging device, a sound collector, a medical device, a network home appliance, an automobile (Connected Car), a notebook personal computer (PC), a mobile phone, a smartphone, a tablet terminal, a game console, a personal digital assistant (PDA), a digital camera, a wearable PC or a desktop PC, as long as the information processing apparatus has a communication function.

The embodiments of the present invention include a program. For example, the program causes a computer to execute processes of storing a retained log that has not been transferred to an external device among logs generated in response to the execution of jobs, and reactivating the information processing apparatus based on the number of the retained logs. With this program, it is possible to obtain the same effect as the above-described information processing system.

The embodiments of the present invention include an information processing method. For example, the information processing method includes storing a retained log that has not been transferred to an external device among logs generated in response to the execution of jobs, and reactivating the information processing apparatus based on the number of the retained logs. With this information processing method, it is possible to obtain the same effect as the above-described information processing system.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An information processing apparatus comprising:
 a memory that stores a retained log which has not, been transferred to an external device, among a plurality of logs generated in response to execution of a job; and
 circuitry configured to stop operating the information processing apparatus and reboot the information processing apparatus, based on a number of retained logs,
 wherein the circuitry determines whether to restart or stop operating the information processing apparatus based on a result of transferring the retained log to the external device after rebooting the information processing apparatus.

2. The information processing apparatus according to claim 1,
 wherein the circuitry reboots the information processing apparatus when the number of retained logs is equal to or greater than a threshold value.

3. The information processing apparatus according to claim 1,
 wherein the circuitry transfers the retained log to the external device after rebooting the information processing apparatus, and, restarts operating the information processing apparatus when the circuitry succeeds transferring the retained log.

4. The information processing apparatus according to claim 1,
 wherein the circuitry transfers the retained log to the external device after rebooting the information processing apparatus, and stops operating the information processing apparatus when the transfer fails.

5. The information processing apparatus according to claim 1,
 wherein the memory further stores a history of retention abnormality in which the number of retained logs becomes equal to or greater than a threshold value.

6. The information processing apparatus according to claim 1,
 wherein the circuitry controls a display to display a notification screen for notifying occurrence of retention abnormality in which a number of the retained logs becomes equal to or greater than a threshold value after rebooting the information processing apparatus.

7. The information processing apparatus according to claim 1,
 wherein the circuitry controls a display to display an input screen allowing a user to input setting information for transferring the log to the external device after rebooting the information processing apparatus.

8. An information processing system comprising:
 the information processing apparatus according to claim 1; and
 a server configured to store the log transferred, wherein the server operates as the external device.

9. An information processing system comprising:
 an information processing apparatus; and
 a server communicably connected to the information processing apparatus via a network,
 wherein the information processing apparatus includes first circuitry configured to transfer to the server a log generated in response to execution of a job,
 wherein the server includes a memory that stores the log transferred, and
 wherein the first circuitry stores in the memory a retained log which has not been transferred to the server, among a plurality of generated logs,
 wherein the first circuitry stops operating the information processing apparatus and reboots the information processing apparatus, based on a number of retained logs, and
 wherein the first circuitry determines whether to restart or stop operating the information processing apparatus based on a result of transferring the retained log after rebooting the information processing apparatus.

10. An information processing method executed by an information processing apparatus, the method comprising;
 storing in a memory a retained log which has not been transferred to an external device, among a plurality of logs generated in response to execution of a job;
 stopping operating the information processing apparatus and rebooting the information processing apparatus, based on a number of retained logs, and
 determining whether to restart or stop operating the information processing apparatus based on a result of transferring the retained log to the external device after rebooting the information processing apparatus.

* * * * *